United States Patent

[11] 3,579,971

[72] Inventors Jean Sagouspe;
  Eugene D. Riley, Los Banos, Calif.
[21] Appl. No. 8,944
[22] Filed Feb. 5, 1970
[45] Patented May 25, 1971
[73] Assignee Genie Grape Harvester, Inc.
  Los Banos, Calif.

[54] CATCH FLOOR FOR GRAPE HARVESTERS
  10 Claims, 4 Drawing Figs.
[52] U.S. Cl. ................................................ 56/330
[51] Int. Cl. ............................................ A01g 19/00
[50] Field of Search .......................................... 56/330,
  331, 30, 36, 40, 41, 42, 43, 44—47

[56] References Cited
  UNITED STATES PATENTS
| | | | |
|---|---|---|---|
| 2,489,963 | 11/1949 | Henley | 56/30 |
| 3,165,879 | 1/1965 | Chapin | 56/330 |
| 3,184,908 | 5/1965 | Rust | 56/330 |
| 3,473,311 | 10/1969 | Fox | 56/330 |
| 3,478,501 | 11/1969 | Patzlaff | 56/330 |

*Primary Examiner*—Russell R. Kinsey
*Attorney*—Webster and Webster

ABSTRACT: A longitudinal, transversely centrally peaked, detached-grape catch floor for a grape harvester of the type which straddles and moves along a row of grapevines growing on wires supported by posts; the catch floor, which is fashioned to permit the unobstructed relative passage therethrough of the posts and adjacent grapevine trunks with advance of the harvester, comprising—between transversely spaced, longitudinal side conveyors—two longitudinal panels of heavy-duty and flexible and resilient material disposed side-by-side with their inner edges lapped, and each thence inclining downwardly and laterally outwardly to its outer edge and to the corresponding side conveyor, and said panels each having therein a row of longitudinally spaced diagonal slits open to its inner edge whereby pairs of laterally mating flaps are formed on the panels. Such pairs of flaps yield upwardly in progression with the relative passage through the catch floor of each post and adjacent grapevine trunk, and then immediately return to their edge-lapped closed position. The panels are spring-finger supported from below, clear of the flaps, and out of the path through the catch floor of said posts and grapevine trunks.

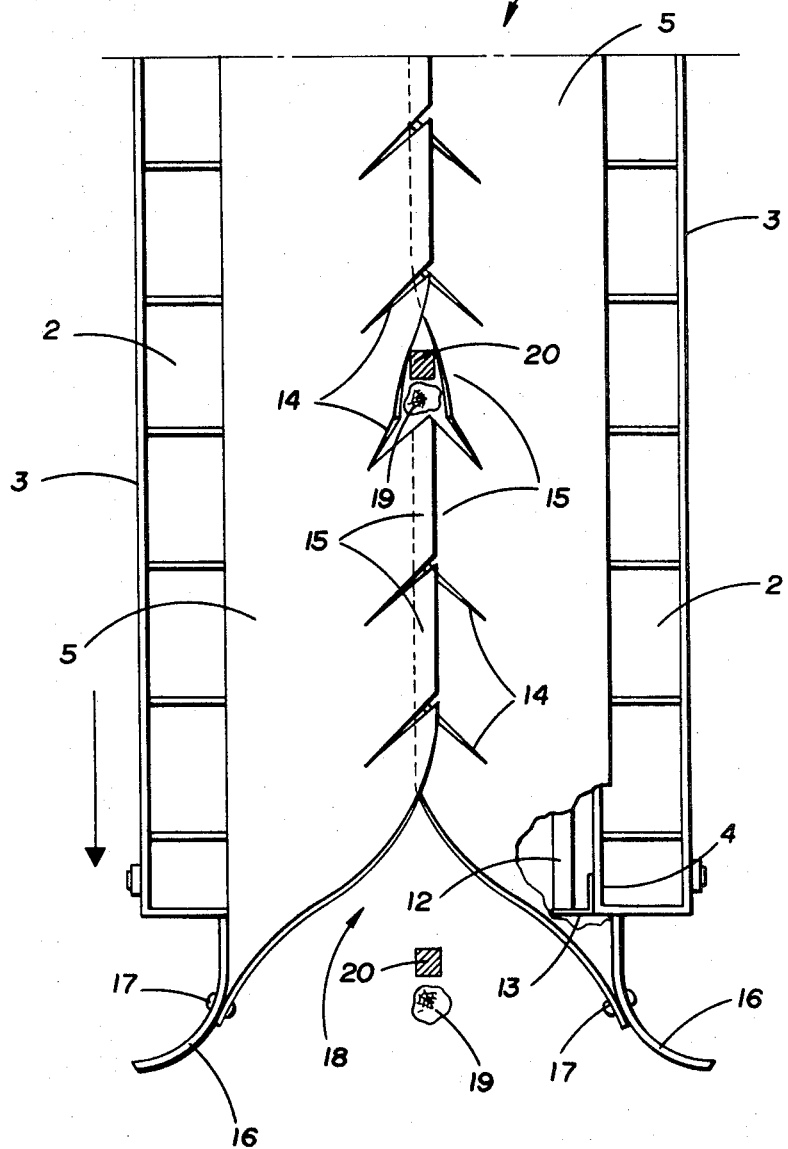

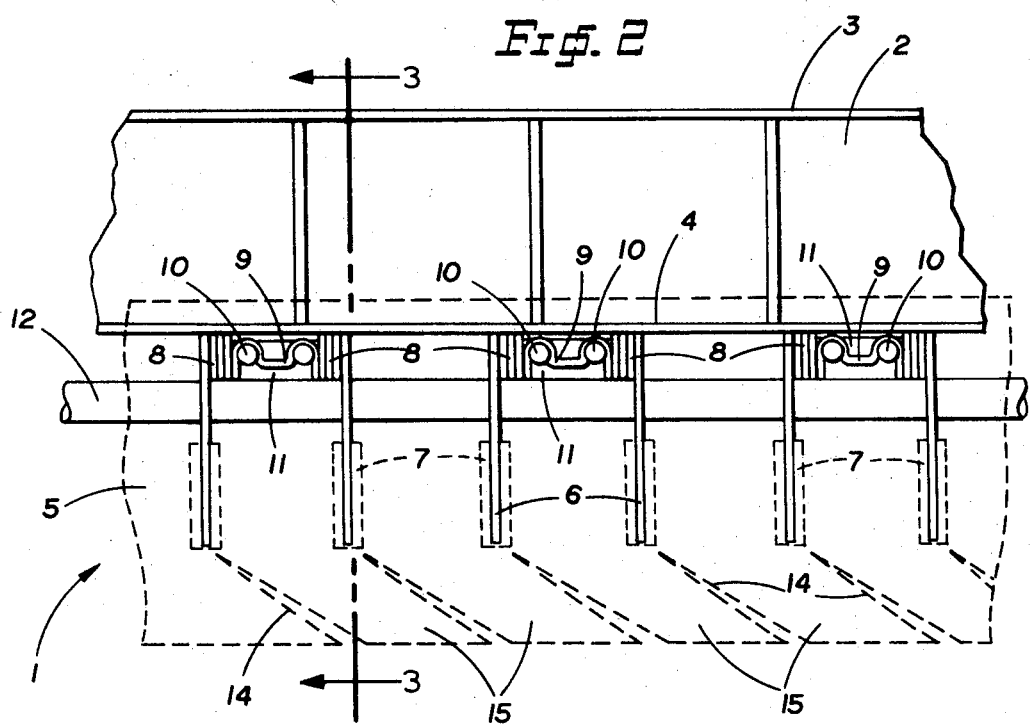
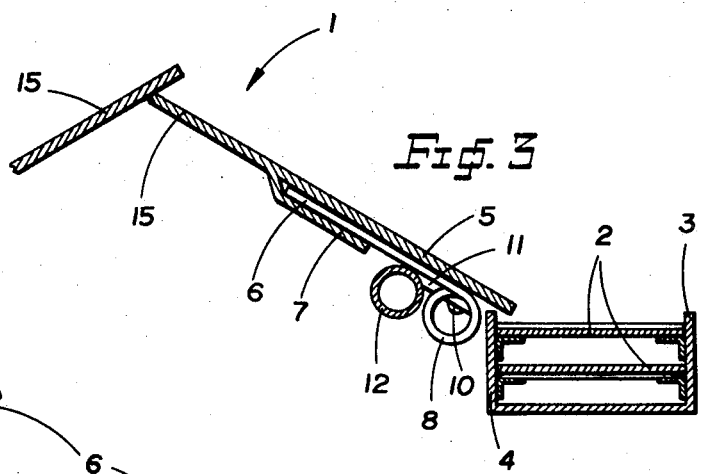
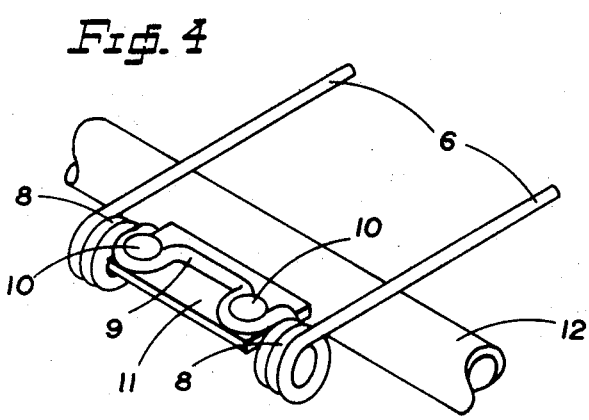

CATCH FLOOR FOR GRAPE HARVESTERS

BACKGROUND OF THE INVENTION

Grape harvesters are now known of a type which straddle and move along a row of grapevines growing on wires supported by posts; the grapes being detached from the vines by a shaker mechanism in the harvester and thence falling onto a longitudinal, transversely centrally peaked catch floor and from opposite sides of which the detached grapes discharge onto longitudinal side conveyors. Such catch floor is formed so as to permit the posts and adjacent grapevine trunks to relatively pass through the floor with advance of the harvester while causing only a progressive opening in such catch floor; this to minimize the loss of detached grapes falling toward said catch floor. While catch floors, for the described purpose, have heretofore been known in sundry embodiments, they have not been wholly satisfactory either because of complexity in structure or an undue loss of detached grapes therethrough. The present invention was conceived in view of such problems.

SUMMARY OF THE INVENTION

The present invention provides, as a major object, a longitudinal, transversely centrally peaked, detached-grape catch floor for a grape harvester of the type described; the catch floor, in its present embodiment, comprising (in a position between transversely spaced, longitudinal side conveyors of the harvester) two longitudinal panels of heavy-duty flexible and resilient material (such as belting) disposed side-by-side with their inner edges lapped and each thence inclining downwardly and laterally outwardly to its outer edge and to the corresponding side conveyor; the panels—which are substantially flat-surfaced transversely—each being formed with a row of longitudinally spaced diagonal slits open to its inner edge, and which slits form—in the panels—pairs of laterally mating flaps which yield upwardly, in progression, with the relative passage of each post and grapevine trunk through the catch floor. The opening produced by said upward yielding of the flaps of each pair is of relatively small size and hence prevents any substantial loss through such opening of detached grapes which fall in the direction of the catch floor. Further, the opening—as produced by upward yielding of each pair of flaps—quickly closes (after passage between such pair of flaps of each post and adjacent grapevine trunk) by reason of the resilient flaps reassuming their lapped position.

The present invention provides, as a further object, a catch floor for grape harvesters which is designed for ease and economy of manufacture.

The present invention provides, as a still further object, a practical, reliable, and durable catch floor for grape harvesters and one which is exceedingly effective for the purpose for which it is designed.

BRIEF DESCRIPTION OF THE DRAWINGS

FIG. 1 is a plan view of a longitudinal portion, including the forward or entry end, of the present catch floor.

FIG. 2 is an enlarged fragmentary plan view showing the manner of spring-finger supporting, from below, of each longitudinal panel; the one panel illustrated being depicted, by broken lines, in phantom to permit disclosure of the spring finger arrangement therebeneath.

FIG. 3 is a fragmentary cross section on substantially line 3—3 of FIG. 2 but adds the adjacent portion of the other longitudinal panel in order to show the lap of the two panels at the longitudinal, central peak of the catch floor.

FIG. 4 is a fragmentary perspective view showing in detail the manner of securing each spring finger unit to the adjacent longitudinal rub bar.

DESCRIPTION OF THE PREFERRED EMBODIMENT

Referring now more particularly to the drawings and to the characters of reference marked thereon, the catch floor of the present invention is indicated generally at 1 and is adapted for use in a grape harvester of the type which straddles and moves along a row of grapevines growing on wires supported by posts. Such a grape harvester (as shown for example in copending application Ser. No. 817,863) includes a shaker mechanism which causes detachment of the grapes from the vines; the detached grapes then falling onto the catch floor 1 and which extends longitudinally and fills the space between a pair of transversely spaced, longitudinal, side conveyors 2 of endless belt-type.

The catch floor 1 is transversely centrally peaked so that detached grapes, which fall onto such catch floor, slide down the sides thereof and thence discharge into the side conveyors 2. Each of such conveyors 2 includes a trough 3 having an inner wall 4.

The catch floor 1 is comprised of a pair of longitudinal panels 5 of heavy-duty flexible but resilient material (such as belting) disposed side-by-side with their inner edges slightly lapped and each (which is substantially flat-surfaced transversely) thence inclining downwardly and laterally outwardly to its outer edge. The outer edge portion of each panel 5 overlies the corresponding inner wall 4 of the trough 3 of the related conveyor 2, whereby detached grapes falling on the catch floor 1 slide down one or the other of panels 5 and discharge therefrom onto said related conveyor 2.

The laterally inclined panels 5 are each supported, from below, by a row of spring fingers 6 disposed in equally longitudinally spaced relation and extending, at a right angle from adjacent the corresponding inner wall 4, at an upward and laterally inward incline to a free end termination a substantial distance back from the inner edge of the panel; the underside of the panel being formed with pockets 7 in which the spring fingers 6 engage. The spring fingers 6, of each longitudinal row thereof, extend in pairs from the outer ends of axially spaced coil springs 8 integral at their inner ends with a double-loop connector 9 secured by bolts 10 to an earlike attachment plate 11 fixed on and which radiates generally outwardly from a longitudinal bar 12 disposed adjacent but spaced inwardly from the corresponding inner wall 4. At its ends, each bar 12 is supported from the adjacent inner wall 4 by stand-off brackets, one of which is shown at 13.

The panels 5 are each formed with a row of longitudinally spaced diagonal slits 14 open at one end to the inner edge of the panel and terminating at the other or closed end at a transversely intermediate point on said panel and substantially at the related end of a corresponding one of the spring fingers 6; there being one finger 6 provided in support of the panel for each such slit 14.

The slits 14 are formed in the respective panels with the open ends of corresponding slits substantially at a common meeting point whereby said slits define—in the panels—pairs of laterally mating flaps 15. The slits 14 all extend diagonally to the rear; i.e. in a direction opposite the direction of forward travel of the harvester when in operation.

The harvester, at the front end thereof, includes upstanding, laterally outwardly curved vine deflectors 16; the forward end portions of the panels 5 (ahead of the first pair of slits 14) being turned upwardly to substantially vertical position and fixed to the deflectors 16 by securing elements 17 whereby to form a rearwardly converging entry throat 18 at the forward end of the catch floor 1.

When the harvester is in operation and moving forward, it approaches and then advances—in straddling relation—over each grapevine trunk 19 and adjacent post 20; such grapevine trunk and post relatively passing—without obstruction—through the catch floor 1 from end to end thereof lengthwise of said floor and substantially centrally between the sides thereof. Such unobstructed relative passage of each grapevine trunk and post through the catch floor (after movement through the entry throat 18) occurs by reason of the fact that the pairs of mating flaps 15 are engaged and yield upwardly, in progression, with such relative passage of said grapevine trunk and post. See FIG. 1 wherein one pair of the flaps is shown in such position.

The opening produced by such upward yielding of each pair of flaps 15 is relatively small and, therefore, minimizes the loss therethrough of detached grapes falling toward the catch floor. Further, such opening desirably closes immediately upon passage from between each pair of upwardly yielding flaps 15; such flaps, because of their resiliency, then reassuming their initial lapped edge position. Also, by reason of the rearward diagonal of the slits 14, and the resultant diagonal disposition of the flaps 15, each flap of the mating pairs thereof can yield upwardly with greater facility when engaged by a post 20. In other words, the drag imposed on the post is substantially reduced and as necessary to prevent displacement or breakage thereof.

From the foregoing description, it will be readily seen that there has been produced such a catch floor for grape harvesters as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

We claim:

1. A longitudinal, transversely peaked, detached-grape catch floor for a grape harvester of the type which straddles and moves along a row of grapevines growing on wires supported by posts; the catch floor, adapted to permit of unobstructed relative passage therethrough of the posts and adjacent grapevine trunks with advance of the harvester, comprising two longitudinal panels of heavy-duty flexible and resilient material disposed side-by-side with their inner edges normally in closed relation to each other, each panel being inclined downwardly and laterally outwardly to its outer edge, said panels each having therein a row of longitudinally spaced transverse slits open to its inner edge whereby pairs of laterally mating flaps are formed on the panels, and means supporting the panels without restricting upward yielding of said pairs of mating flaps in progression and as attendant said relative passage through the catch floor of the posts and grapevine trunks.

2. A catch floor, as in claim 1, in which the panel-supporting means includes spaced fingers underlying the panels in positions clear of the path of the posts and grapevine trunks relatively passing through the catch floor.

3. A catch floor, as in claim 2, including a fixed longitudinal bar disposed beneath the outer edge portion of each panel; the fingers being secured in connection with the bar at longitudinally spaced points and thence projecting laterally from the bar beneath the related panel.

4. A catch floor, as in claim 3, including pockets, on the underside of the panels, into which the fingers extend.

5. A catch floor, as in claim 4, in which the pockets are disposed on the panels clear of the flaps.

6. A catch floor, as in claim 3, in which each finger is integral with and extends from one end of a coil spring; the other end of each coil spring being attached to the related bar.

7. A catch floor, as in claim 1, in which the slits in the panels diagonal to their open ends in a rearward direction relative to forward travel of the harvester, whereby the flaps have a corresponding diagonal disposition.

8. A catch floor, as in claim 1, in which the panels, and consequently the pairs of mating flaps, are normally lapped at their inner edges.

9. A catch floor, as in claim 1, for a harvester which includes transversely spaced, longitudinal, side conveyors; the catch floor occupying the space between said conveyors with the outer edge portions of the panels extending over related ones of such conveyors.

10. A catch floor, as in claim 9, in which the harvester includes vine deflectors upstanding at the front end of the side conveyors; the forward portions of the panels being turned upwardly to substantially vertical and secured to related deflectors whereby to define a rearwardly converging entry throat at the forward end of said catch floor.